United States Patent [19]
Reeves

[11] 3,780,370
[45] Dec. 18, 1973

[54] ELECTRONIC RANGE MEASURING METHOD AND APPARATUS

[75] Inventor: Hewett Maxwell Reeves, Houston, Tex.

[73] Assignee: Brown & Root, Inc., Houston, Tex.

[22] Filed: Mar. 11, 1971

[21] Appl. No.: 123,227

[52] U.S. Cl. ......... 343/17.7, 343/6.5 R, 343/17.2 R
[51] Int. Cl. ........................... G01s 7/40, G01s 9/56
[58] Field of Search .................... 343/6.5 R, 6.5 LC, 343/14, 15, 17.2 R, 17.7

[56] References Cited
UNITED STATES PATENTS

| | | | |
|---|---|---|---|
| 3,728,728 | 4/1973 | Vogel et al .................. | 343/6.5 R X |
| 3,648,177 | 3/1972 | Himmel ..................... | 343/17.2 R X |
| 3,618,089 | 11/1971 | Moran ........................ | 343/15 X |
| 3,611,377 | 10/1971 | Rittenbach ................ | 343/17.2 R X |

*Primary Examiner*—T. H. Tubbesing
*Attorney*—Burns, Doane, Swecker & Mathis

[57] ABSTRACT

A method and apparatus for electronically providing information as to the distance between two spaced locations, the information being particularly useful for determining and controlling position in offshore operations such as pipeline and cable laying, surveying and other such operations requiring extremely accurate position information. The range information provided by the present invention is extremely accurate since the system dynamically eliminates errors due to unpredictably varying equipment introduced signal delays as well as the relatively fixed signal delays introduced by the equipment. This results in the extremely accurate position information required for offshore operations when the system is utilized to determine the range to two locations from the unknown offshore position so that the unknown position can be determined by conventional trigonometric techniques.

42 Claims, 8 Drawing Figures

INVENTOR
HEWETT MAXWELL REEVES

BY Burns, Doane, Swecker & Mathis

ATTORNEYS

ELECTRONIC RANGE MEASURING METHOD AND APPARATUS

RELATED CASES

The present invention relates to an improved system of the type disclosed and claimed in the copending Jones and Lochridge U.S. Pat. application Ser. No. 886,562, now U.S. Pat. No. 3,725,919, for "Method and Apparatus for Plotting Vessel Position", filed Dec. 19, 1969, and assigned to the assignee of the present invention, and specifically to an improvement in the range determining portion of the Jones and Lochridge system. Moreover, the invention relates to an improvement in the Jones et al system as used for laying pipeline from a pipelaying barge utilizing a pipelaying system of the type disclosed and claimed in the Lawrence U.S. Pat. No. 3,390,532 and assigned to the assignee of the present invention. The disclosure of said application Ser. No. 886,562 and the Lawrence U.S. Pat. No. 3,390,532 are hereby incorporated herein by reference.

BACKGROUND OF THE INVENTION

The present invention relates to a method and apparatus for electronically determining the distance between two locations, and more specifically relates to a novel method and apparatus for applying dynamic corrections to electronically measured distance information to eliminate equipment induced errors, particularly where highly accurate range measurements are needed as in offshore surveying, pipeline and cable laying and other offshore operations.

Accurate range measurements are essential in numerous tracking, guidance and surveying operations. For example, the offshore operations involving surveying, pipeline or cable laying, location of underwater objects and positioning of buoyant surface objects may involve the use of range measurements between a vessel and relatively fixed objects for determining the geographical position of the vessel by trigonometric techniques. If the positions of the relatively fixed objects are known and the respective range between these objects and the vessel can be calculated to a high degree of accuracy, the geographical location of the vessel may likewise be calculated to a high degree of accuracy.

Extreme accuracy may be particularly important in the laying of underwater elongate, flexible means such as cable and pipeline. For example, it may be necessary to follow a predetermined underwater pipeline route with extreme accuracy because of the severely limited extent of the right of way on either side of the route and because of the existence of obstructions on the ocean floor. Such problems may give rise to a requirement for very close tolerances in following a course which can vary erratically. In addition, an accurate record of the actual position of the pipeline on the ocean floor may be required for job certification where the contract calls for specific tolerances to be kept or for future reference in locating the pipeline and its associated fittings for maintenance and/or repair.

Even if a highly accurate record of the position of the pipeline and its associated fittings is produced during the pipelaying operations, these records are of limited utility if the plotted position cannot be accurately located at a future date. Since inaccuracies may give rise to particularly difficult problems in locating the underwater pipeline or fittings, it can be seen that great amounts of time and money may be saved where extremely accurate range measurements are utilized during position-critical offshore operations.

A number of range measuring systems have been developed in an attempt to provide the accuracy required for the above described operations. All of these generally known systems utilize time measurements, i.e. the time required for electromagnetic energy to travel the distance between the unknown and known geographical locations. For example, in pulsed distance measuring systems a pulse of wave energy is transmitted from one location toward the other location and an echo or return pulse is detected by the equipment at the transmitting location. Range is then calculated by measuring the time interval between the transmission and the reception of the returned pulse, dividing by two to convert to a one-way range, and by then multiplying the measured time by the speed of the wave energy in air to convert time to distance. This measuring technique is similar to phase measuring techniques in which a signal is transmitted toward the distant location and is returned therefrom and the phase difference between the transmitted and received signal is determined for multiplication by the reciprocal of the frequency, i.e. the wavelength of the transmitted signal to obtain the signal round trip time and subsequently the distance travelled by the signal during this time interval.

Since the accuracy of the range calculated by these systems depends upon the accuracy of the measurement of the time it takes the signal to travel through the atmosphere between the two locations, signal delays caused by anything other than the finite travel time of the signal through the atmosphere cause errors in the distance measurement. Thus, signal delays introduced by the equipment utilized to send and receive the signal and to calculate the transmission time may introduce serious errors in the range measurement.

Equipment introduced signal delays must therefore be subtracted from the total transmission time interval prior to using this time interval to calculate range. However, these equipment introduced signal delays include both relatively fixed delays and delays which may vary unpredictably. In the intermediate frequency stages of the receivers, for example, erratic variations in signal delay may occur due to changes in temperature, aging of components and variations in signal level.

To somewhat reduce these unpredictable variations, elaborate temperature control systems and extremely expensive components may be utilized, thereby permitting the varying delays to be more accurately treated as fixed delays. However, it is apparent that even such elaborate and expensive precautions do not entirely eliminate the problem of unpredictably varying delays. Moreover, frequent calibration of the equipment may be needed to retain the equipment accuracy.

It is therefore an object of the present invention to obviate these and other problems of prior art range measuring systems.

It is a further object of the present invention to provide a novel method and apparatus for dynamically correcting for equipment introduced signal delays in time measurements used to calculate distance.

It is another object of the present invention to provide a novel method and apparatus for dynamically eliminating range errors from range calculations and location calculations based therein which are due to unpredictably varying, equipment introduced signal delays.

It is yet a further object of the present invention to provide a novel method and apparatus for determining the distance between two locations by generating frequency shift keyed time reference marks and measuring the time interval between the transmission and reception of the time reference marks.

It is yet another object of the present invention to provide a novel method and apparatus for determining the distance between two locations by generating a signal related in frequency to the transmission time of a signal between the two locations including the transmission time of the signal through equipment at the two locations, and signals related in frequency to the transmission time of a signal through the equipment at the two locations whereby the distance between the two locations can be calculated as a function of the frequency of the two signals.

It is still another object of the present invention to provide a method and apparatus for more accurately conducting and providing records for offshore operations.

A first significant method aspect of the present invention involves determining the distance between two spaced locations by dynamically establishing a first time interval related in duration to the total round trip transmission time of a signal between the two locations including equipment introduced signal delay times, dynamically establishing a second time interval related in duration to the equipment introduced signal delay times, and manifesting the distance between the two locations responsively to the first and second established time intervals.

In one embodiment, the first time interval is established by transmitting a total delay time reference mark from one of the locations to the other of the locations, returning the total delay time reference mark from the other of the locations back to the one of the locations, detecting the total delay time reference mark returned from the other of the locations and measuring the time interval between the transmission and detection of the total delay time reference mark at the one of the locations. The second time interval is established by generating a first equipment delay time reference mark related in time to the total delay time reference mark in accordance with equipment delay at the other of the locations, generating a second equipment delay time reference mark related in time to the first equipment delay time reference mark in accordance with the equipment delay at the one of the locations, and measuring the time interval between the total delay time reference mark and the second equipment delay time reference mark.

In a second embodiment, the first time interval is established by generating a first signal having a first natural frequency related to both the total round trip transmission time of a signal between the two locations including equipment introduced signal delays and then determining the wavelength of the signal. Th The time interval is determined by generating second and third signals having second and third natural frequencies related respectively to the signal delay introduced by equipment at the two locations and summing the wavelength of the second and third signals.

Another significant aspect of present invention is the provision of a novel combination of apparatus means to accomplish, in coordinated relation, the various steps of the first method above described.

A second significant method aspect of the present invention involves determining the geographical coordinates of an unknown geographical location by calculating the range from the unknown location to two known geographical locations in accordance with the above-described first method and then manifesting the geographical coordiantes of the unknown geographical location in response to the known geographical coordinates and the two measured ranges. The unknown location may represent the unknown geographical position of an offshore vessel and the determined geographical coordinates may be utilized to plot the actual position of the vessel relative to a preplotted desired course or to position the vessel relative to the desired course.

Yet another significant aspect of the present invention is the provision of a novel combination of apparatus means to accomplish, in coordinated relation, the various steps of the second method above described.

A third significant method aspect of the present invention involves determining the distance between two locations by transmitting a substantially continuous wave carrier signal having a predetermined frequency from one of the locations to the other of the locations, returning the carrier signal from the other of the locations to the one of the locations, rapidly effecting a discrete change in the frequency of the carrier signal for a predetermined period of time at the one of the locations, detecting at the one of the locations both the transmission and return of the discrete frequency change of the carrier signal, and manifesting the distance between the two locations responsively to the detecting of the transmission and return of the discrete frequency change.

A further significant aspect of the present invention is the provision of a novel combination of apparatus means to accomplish, in coordinated relation, the various steps of the third method above described.

A fourth significant method aspect of the invention involves the laying of pipeline from a pipelaying barge utilizing the above described first method for determining ranges from the barge to two known geographical locations, calculating the barge position from the two determined ranges, and manifesting the actual route along which the pipeline is deposited responsively to the calculated barge position.

Yet a further significant aspect of the invention is the provision of a novel combination of apparatus means to accomplish, in coordinated relation, the various steps of the fourth method above described.

THE DRAWINGS

DETAILED DESCRIPTION

An understanding of the present invention may be facilitated by a general and more detailed description of the system and its various parts as set out in accordance with the following table:

TABLE OF CONTENTS

I. GENERAL SYSTEM CONTEXT (FIGS. 1-5).
II. THE RANGE MEASURING SYSTEM
  A. PULSED EMBODIMENT (FIGS. 6 and 7)
  B. CONTINUOUS WAVE EMBODIMENT (FIG. 8)
III. ADVANTAGES AND SCOPE OF THE INVENTION

I. GENERAL SYSTEM CONTEXT

Figure 1:
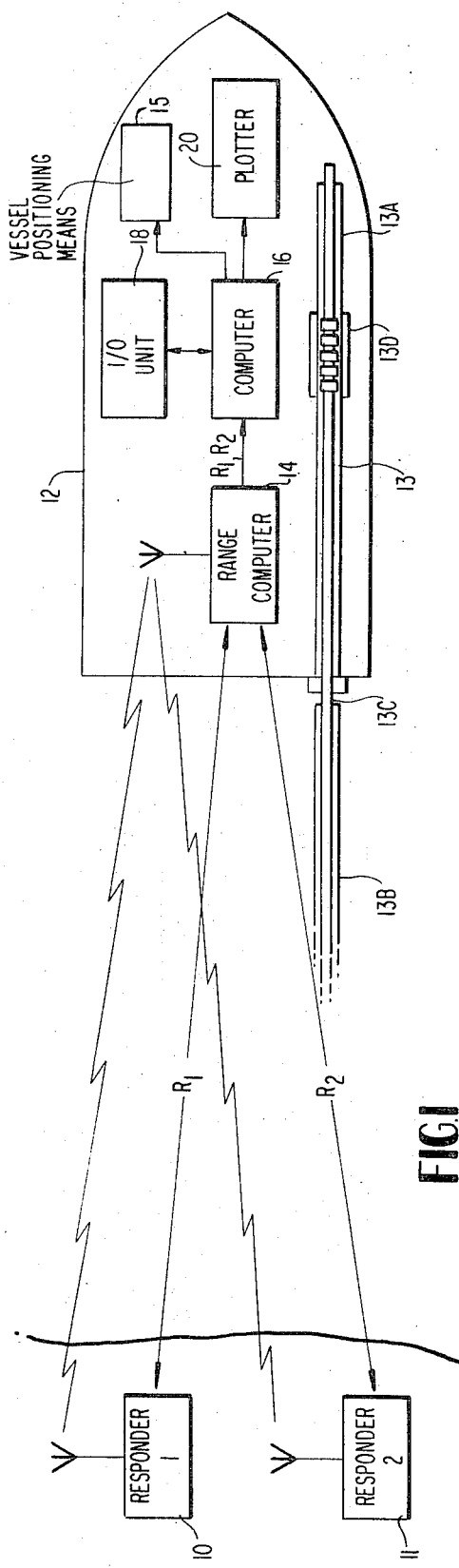
FIG. 1 is a functional block diagram of the system of the present invention.

Referring to FIG. 1 where a functional block diagram of a vessel position plotting system with which the present invention may be utilized is shown, a pair of transponders or responders 10 and 11 are provided at predetermined geographical locations. The responders 10 and 11 are preferably on shore and are preferably at elevated positions relative to sea level.

A vessel 12 is provided with a range computer or interrogator unit 14 which calculates the ranges $R_1$ and $R_2$ respectively to the responders 10 and 11 and which supplies this range information to a general purpose digital computer 16 in a suitable form, e.g. binary coded decimal. The computer 16 is also provided, by way of a conventional input/output unit 18, with information such as the coordinate positions of the responders 10 and 11, the refractivity of the atmosphere, various plotter constants, and information as to the particular coordinate system utilized. The computer 16 is programmed to utilize this information to supply plotter command signals to a plotter 20, preferably of the incremental digital plotter type.

A desired vessel course or route is preplotted on a chart carried by the plotter 20. The computer 16, utilizing the range and other supplied information, provides a real time indication of actual vessel position in the form of the plotter command signals and thereby effects the plotting of present vessel position on the chart. In this manner a record of the actual route followed by the vessel relative to the preplotted desired route may be generated.

If, for example, this record is generated aboard a barge while laying elongate, flexible means such as a pipeline or cable on an ocean floor, the record indicates the relatiohship between a desired pipeline route and the actual route which the pipeline follows. This record thus provides extremely accurate data for job certification and for future maintenance and repair.

In addition, during the real time plotting of actual vessel position relative to the desired route, an extremely accurate comparison may be made between actual and desired vessel position at any time. The vessel may therefore be positioned in accordance with this comparison to more closely follow the desired route.

A system of the above type is more fully described in Jones and Lochridge United States application Ser. No. 886,562, entitled "Method and Apparatus for Plotting Vessel Position," filed Dec. 19, 1969, and assigned to the assignee of the present invention. The disclosure of said application Ser. No. 886,562 is hereby incorporated herein by reference.

The system may be used, for example, in the laying of pipeline with equipment, including pipelaying equipment generally indicated at 13 and vessel positioning equipment generally indicated at 15, of the type described in Lawrence U.S. Pats. Nos. 3,390,532 and 3,472,034 and in Jones et al U.S. application Ser. No. 814,558 filed Apr. 9, 1969 for "Method and Apparatus for Laying Pipeline", now U.S. Pat. No. 3,668,878, all of which are assigned to the assignee of the present invention and are hereby incorporated herein by reference.

For example, as is disclosed in the Lawrence U.S. Pat. No. 3,390,532, the vessel 12 may be provided with pipelaying equipment 13 including a fixed ramp 13A upon which pipe is supported for joining sections thereof by welding. A buoyant ramp or stinger 13B may be pivotally connected at the after end 13C of the barge 12 to the fixed ramp 13A. A tensioning device 13D may be provided along the ramp 13A between the pipe joining station and the pivoted buoyant ramp or stinger 13B.

Figure 2:
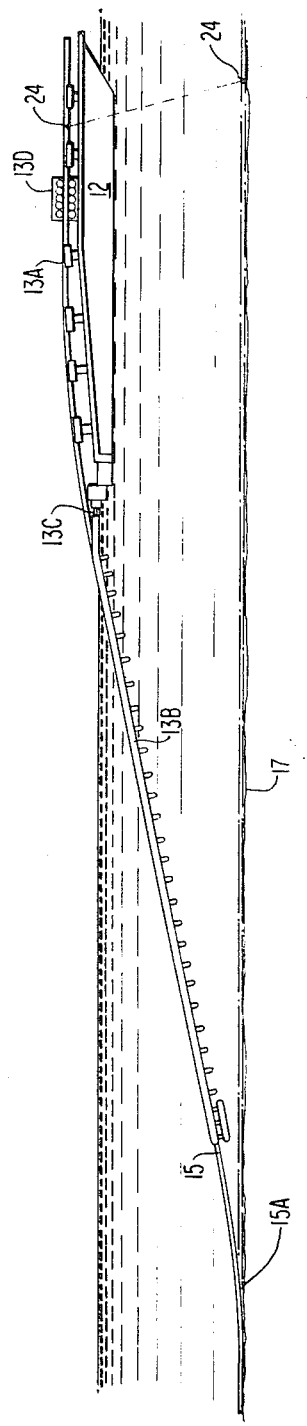
FIG. 2 is a view in elevation of a pipelaying barge laying pipeline on a sea bed.

Sections of pipe are joined together while supported by the fixed ramp 13A and slide rearwardly along the fixed and pivoted ramps into the water, as is illustrated in FIG. 2. The tensioning device 13D applies a predetermined tension to the intermediate portion 15 of the pipeline suspended between the barge and the bottom 17 of the body of water. In this manner, the pipeline may be deposited on the sea bed 17 from a moving barge in water of all depths.

The objective of the invention as applied to pipelaying is to know exactly where the pipeline is being laid both for immediate use in positioning the vessel so that the actual pipeline route coincides with a desired pipeline route and also for future use in relocating the pipeline and its associated fittings.

With continued reference to FIG. 2, it can be seen that the barge 12 is generally positioned ahead of the point of contact 15A between the sea bed and the pipeline. The intermediate section 15 of the pipeline is curved primarily as a function of pipeline strength properties, the tension applied thereto and the depth of the water. Thus, a point 24 on a portion of the pipeline on the barge 12, when deposited on the sea bed, may assume a position ahead of its position on the barge as is illustrated in phantom or may assume a position identical to or behind its position on the barge if the sea bed below the barge slopes greatly enough. This displacement, if any, depends upon the curvature of the intermediate section 15 and the slope of the sea bed and is thus a function of the above enumerated factors.

Figure 3:
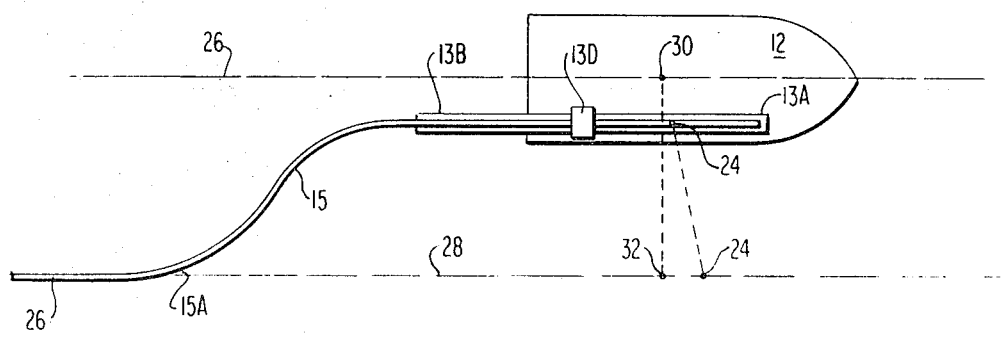
FIG. 3 is a plan view of the pipelaying barge of FIG. 2.
Figure 4:
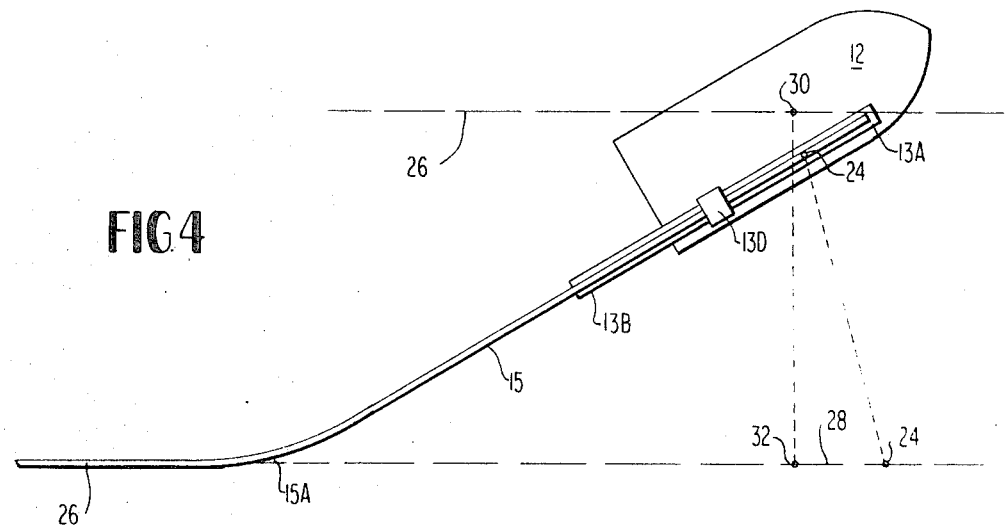
FIG. 4 is a plan view of the pipelaying barge of FIG. 2 utilizing a crabbing technique for laying pipeline.

Moreover, as is illustrated in the plan views of FIGS. 3 and 4, ocean currents and barge heading may further complicate the curvature of the intermediate section 15 of the pipeline. In FIG. 3, for example, barge heading and barge route 26 are substantially parallel to the pipeline route 28, but the pipeline route 28 is displaced to one side of the barge route 26 due to lateral currents. As is illustrated in FIG. 4, barge heading may necessarily be at an angle to barge route 26 and the pipeline route 28 due to the action of the lateral currents on the barge. While the barge route 26 and the pipeline route 28 of FIG. 4 may be substantially parallel, as in FIG. 3, the curvature of the intermediate section 15 of the pipeline is different and the lateral displacement of the pipeline route 28 to one side of the barge route 26 may also be different. Thus, the complex lateral and downward curvature of the intermediate section of the pipeline may also be a function of barge heading and ocean currents, resulting in a further longitudinal displacement of the point 24 of the pipeline (FIG. 2) as well as a lateral displacement between the pipeline route 28 along the sea bed and the barge route 26.

If an accurate record of pipeline route is desired, these various factors should be taken into account. The ranging system of the present invention provides ranges from a position 30 on the barge to the two known geographical locations at which the responders 10 and 11 are located. The position calculated from this information is actual barge position which, as was discussed above, may differ both from the position of the pipeline already in contact with the sea bed and from the future position 32 of the pipeline then on the barge once it is deposited on the sea bed.

Figure 5:
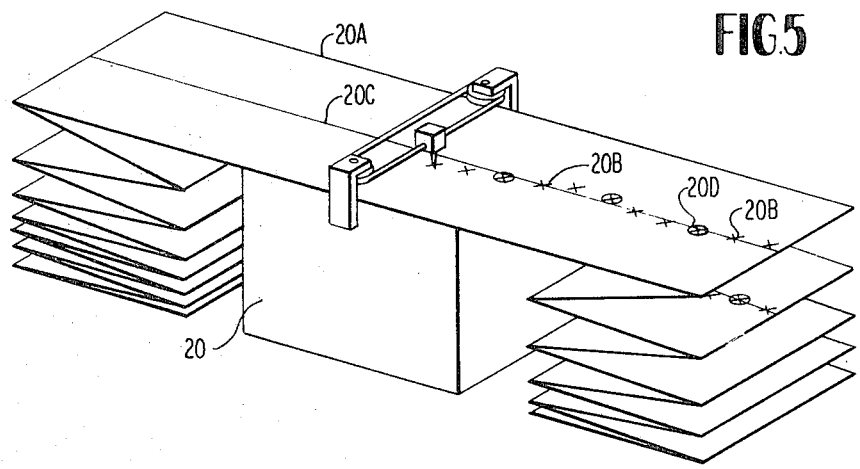
FIG. 5 is a perspective view of the plotter of FIG. 1, with a fan-folded chart thereon.

In any event, the actual route 28 of the pipeline along the sea bed is a function of the route followed by the barge. The pipeline route may therefore be determined from the position of the barge at predetermined intervals. Referring to FIG. 5, a record 20A of actual pipeline route 20B relative to a desired pipeline route 20C, together with an indication of valve or fitting positions 20D, may be desired for immediate reference in positioning the barge 12 and for future reference in locating the pipeline and its fittings. This record may be particularly important in view of the present emphasis on pollution control resulting in a need to be able to rapidly locate troublesome sections of the pipeline.

As was previously discussed, the barge route 26 may or may not coincide with the pipeline route 28. If these routes coincide, i.e. if no lateral currents exist, an accurate record of pipeline route 20B may be obtained by plotting computed barge position on the chart 20A relative to a preplotted desired pipeline route 20C. A slight correction may be introduced by the computer 16 (FIG. 1) to eliminate the longitudinal displacement error discussed in connection with FIG. 2 and to thereby provide a more accurate record of valve position 20D. These corrections may be introduced by monitoring the conditions which cause the longitudinal displacement error and by calculating the error using conventional mathematical techniques either as the pipeline is being laid or at a later time. Alternatively, the corrections may be calculated prior to the pipelaying operation from survey or other information and introduced at the appropriate times during the pipelaying operation.

If lateral currents and therefore the relationship discussed in connection with FIGS. 3 and 4 exist, the computer 16 may introduce corrections for lateral displacement of the pipeline route 28 relative to the barge route 26 to thereby provide a record of actual pipeline route relative to a preplotted desired pipeline route. Alternatively, a desired vessel route may be preplotted, taking into account the lateral displacement and the actual vessel route computed and plotted relative thereto during the pipelaying operation. Converting the record into a record of actual pipeline position may be easily accomplished at a later time if the displacement factors are known. Alternatively, the lateral displacement errors may be calculated by conventional mathematical techniques prior to commencing the pipelaying operation and applied to the calculations of actual barge position prior to plotting to thereby directly plot the actual pipeline route relative to a desired pipeline route.

In the above examples, the information plotted on the chart 20A of FIG. 5 is all predictive of future laid pipeline position information since the pipeline does not touch down on the sea bed until some time after the barge passes over a particular point. Another way of plotting pipeline route would be to correct all the information back to the point 15A at which contact is made between the sea bed 17 and the intermediate section 15 of the pipeline. Any of the above manners of obtaining the desired records may satisfactorily provide the desired accuracy and information.

In the range determining portion of the above described system it is, of course, necessary to interrogate both responder units to determine both ranges $R_1$ and $R_2$. To permit the interrogator unit 14 to independently interrogate the responders at predetermined intervals, a number of alternatives are available. For example, the interrogator unit 14 may periodically transmit a single interrogator signal which triggers both of the responder units 10 and 11. The responder units may then transmit signals at different frequencies which are separated sufficiently to allow the two responder signals to be separated for application to two receivers in the interrogator unit 14 for subsequent range measurement.

Alternatively, the responder units may be initially placed in a standby condition until predetermined codes assigned to each responder are received. A first code may be transmitted to place one of the responders in an operable condition and the range to this responder determined. This responder may then automatically, or on command, revert to the standby condition prior to the transmission of a second code which enables the other responder for subsequent range determination.

The selection of a particular method of obtaining independent range measurements to the two responders may depend on the width of the assigned frequency band and on the nature of the signals employed in determining range. For example, it may not be possible to utilize signals sufficiently separated in frequency due to the limited width of the assigned band. Or, it may not be possible to have both responders transmitting simultaneously (unless two interrogators are provided) where signal frequency itself provides the range information. Thus, the method utilized to obtain independent range measurements must be selected accordingly.

II. THE RANGE MEASURING SYSTEM

Figure 6:
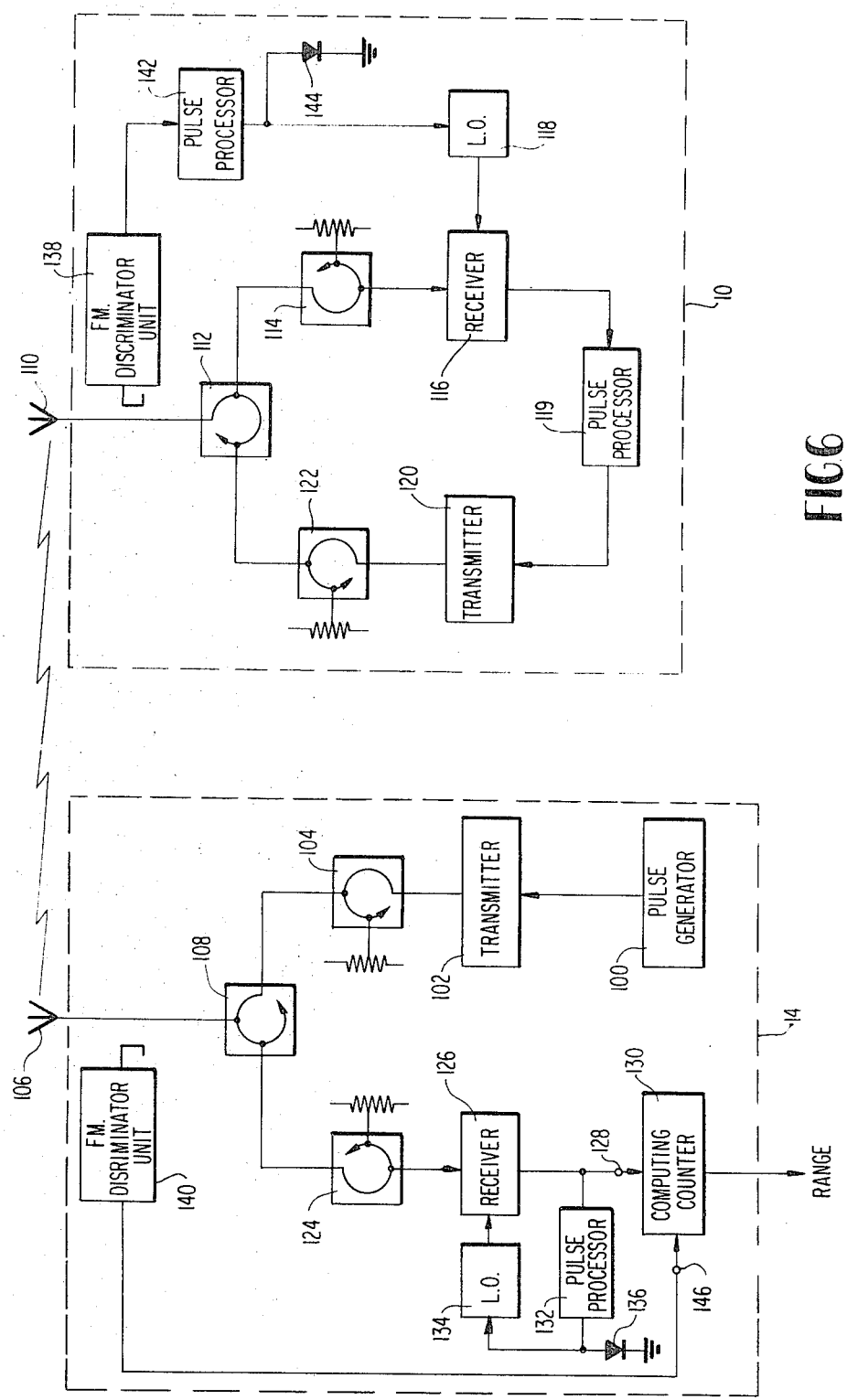
FIG. 6 is a functional block diagram of one embodiment of the range measuring system of FIG. 1.
Figure 8:
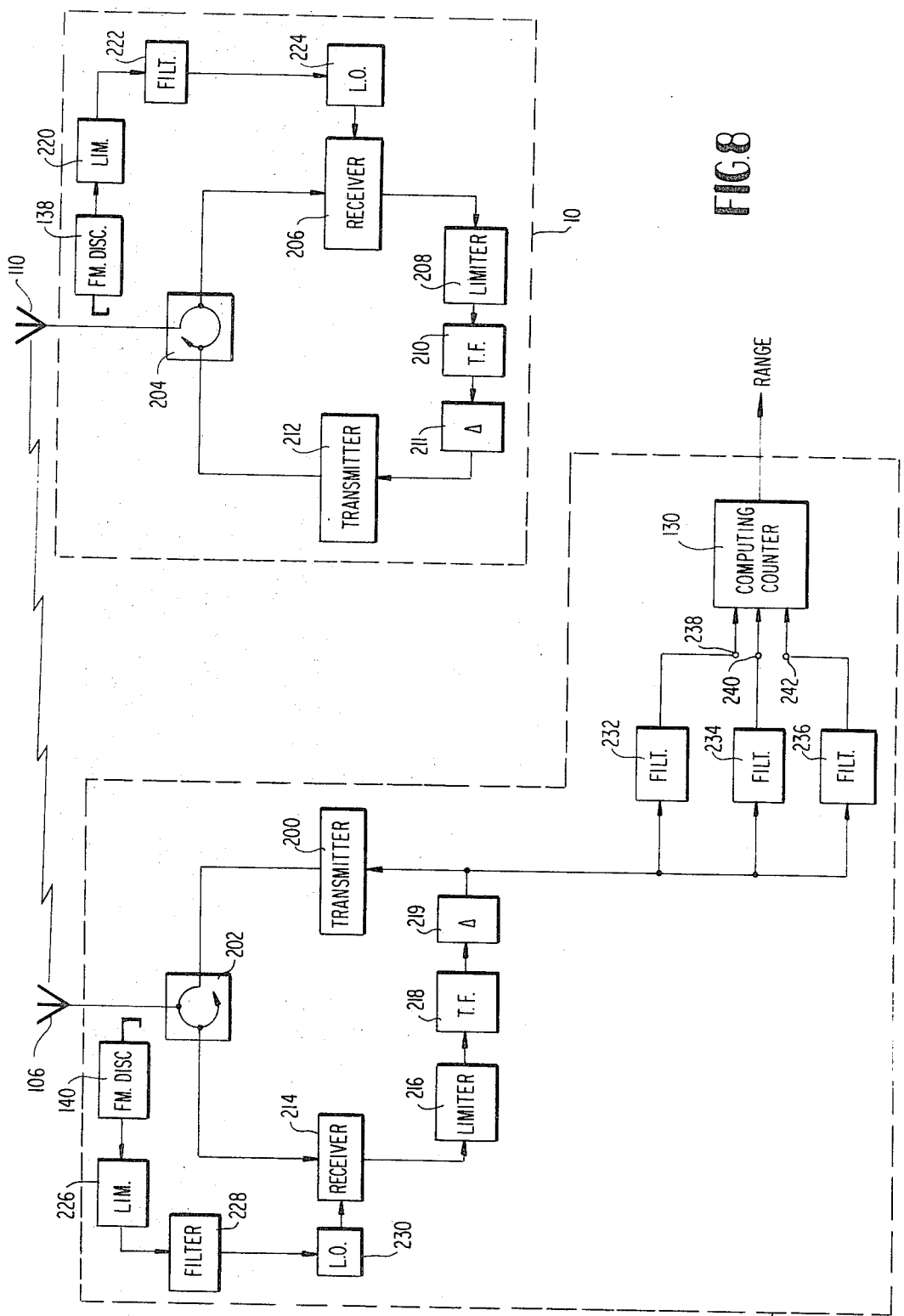
FIG. 8 is a functional block diagram of another embodiment of the range measuring system of FIG. 1.

Functional block diagrams of two embodiments of the range measuring system of the present invention are illustrated in FIGS. 6 and 8. In general, the interrogator unit 14 at one location transmits an interrogation signal to the responder 10 at a remote location. The responder 10 receives the interrogation signal and generates a response signal which is transmitted back to the interrogator unit 14 for processing to provide range data.

Ranging systems of this type depend on a measurement of the time interval between the transmission of a signal and the return of the same or a responsive signal to the transmission site. While there are various ways of determining this time interval, e.g., elapsed time between transmission and reception of a pulse or phase and frequency measurement techniques, all signal delays other than the delay related to the propagation time of electromagnetic wave energy through the atmosphere between the two locations introduce errors into the range data. Because of the nature of the equipment utilized in obtaining the range data, this range data will ordinarily contain errors due, for example, to changes in temperature, to aging of components, and to Miller effect delays caused by variations in signal level. Since all of these conditions cause signal delays which may vary unpredictably, fixed correction techniques based on calculations of the delays under one set of conditions are inaccurate under the varying conditions to which the system is subjected in use. The range measuring system of the present invention eliminates this problem by providing, among other things, a dynamic correction for these unpredictable varying delays.

A. PULSED EMBODIMENT

With reference now to FIG. 6, the output signal from a pulse generator 100 is applied to a suitable conventional voltage controlled frequency modulated (FM) transmitter 102. The pulse generator 100 may provide positive pulses at predetermined intervals, e.g. at 1 millisecond intervals, which rapidly (e.g. within a few nanoseconds) change the frequency $f_o$ of the carrier signal from the transmitter 102 to a higher frequency $f_o + \Delta f$ and maintain the frequency at this higher, discrete level for the duration of each pulse. Thus, each time a pulse from the pulse generator 100 is applied to the FM transmitter 102, a time reference mark represented by a rapid change in carrier frequency of the transmitter 102 is generated. The output signal from the transmitter 102 may be applied through a suitable conventional isolator 104, such as the resistively terminated circulator illustrated, to a phased array, parabolic disk or other suitable conventional antenna 106 by way of a suitable conventional directional coupler 108, e.g. a circulator or T/R tube.

The signal applied to the antenna 106 is transmitted in the form of electromagnetic wave energy, i.e. radiated, toward the responder 10 and is detected at the responder 10 by a suitable conventional antenna 110. This detected or received signal is applied via suitable cable or waveguide and through a suitable conventional directional coupler 112 and a conventional isolator 114 to a conventional FM receiver 116 tuned to the carrier frequency of the transmitter 102. The received signal is amplified by the receiver 116 and is beat with the output signal from a suitable local oscillator 118 to provide an intermediate frequency (IF) signal for further amplification by the IF amplifiers in the receiver 116 and for subsequent detection in a conventional manner of the frequency changes or modulation relative to the carrier frequency $f_o$.

The receiver 116 detects any frequency shift or modulation of the received signal, e.g. the time reference marks on the transmitter 102 carrier signal, and the detected modulation signal from the receiver 116 is applied through a suitable non-inverting pulse processing circuit 119 to a conventional voltage controlled FM transmitter 120. The output signal from the transmitter 120 is a carrier signal at a predetermined frequency $f_o$ which is modulated in accordance with the output signal from the pulse processing circuit 119. The transmitter output signal may be applied through a suitable isolator 122 and through the directional coupler 112 to the antenna 110. The signal from the transmitter 120 is radiated by the antenna 110 toward the interrogator unit 14 where the signal is detected by the antenna 106.

The signal from the responder 10 detected by the antenna 106 is applied through the directional coupler 108 and through a suitable conventional isolator 124 to a suitable conventional FM receiver 126. The receiver 126 operates, as was previously described in connection with the receiver 116, to amplify and detect the FM modulation of the received or detected signal. The FM modulation signal from the receiver 126 is applied to an input terminal 128 of a computing counter 130 and to the non-inverting input terminal of a pulse processing circuit 132 of the type previously described. The output signal from the pulse processing circuit 132 is applied to a local oscillator 134 which controls the IF frequency of the receiver 126. This output signal is also applied to the anode electrode of a conventional semiconductor diode, the cathode electrode of which is connected directly to signal common or ground potential.

In both the responder 10 and the interrogator 14, suitable conventional FM discriminator units 138 and 140, respectively, are provided on the antenna sides of the respective directional couplers 112 and 108. The discriminator units 138 and 140 are preferably positioned as close as possible to the antennas 110 and 106, respectively, and may be provided within or on the antennas where possible. The discriminator units 138 and 140 detect certain of the signals transmitted by the respective antennas 110 and 106 while ignoring any signals received thereby. A resonant cavity type discriminator utilizing temperature insensitive resonant cavities, e.g. an Envar microwave discriminator, is preferred.

The discriminator units 138 and 140 are tuned to the frequency $f_o$ at which the transmitters 102 and 120 normally transmit in the absence of the application of modulating pulses thereto. Thus, when the transmitters 102 and 120 are transmitting at the frequency $f_o$, the output sigals from the discriminator units 138 and 140 are conveniently at a zero volt d.c. level. When the transmitted signals are frequency modulated, for example, when a time reference mark is generated by changing the frequency of the output signals from the transmitters from $f_o$ to $(f_o \pm \Delta f)$, the output signals from the discriminator units 138 and 140 assume a corresponding positive or negative signal level proportional to the amount and direction of deviation of the frequency of the detected transmitted signal from the frequency $f_o$.

The output signal from the FM discriminator unit 138 is applied to the inverting input terminal of a suitable conventional pulse processing circuit 142 of the type previously described and the output signal from the pulse processing circuit 142 is applied to the local oscillator 118 and is also applied to the anode electrode of a conventional semi-conductor diode 144, the cathode electrode of which is connected directly to signal common or ground potential.

The output signal from the FM discriminator unit 140 in the interrogator unit 14 is applied to an input terminal 146 of the computing counter 130 either directly, as illustrated, or through a suitable pulse processing circuit (not shown).

Figure 7:
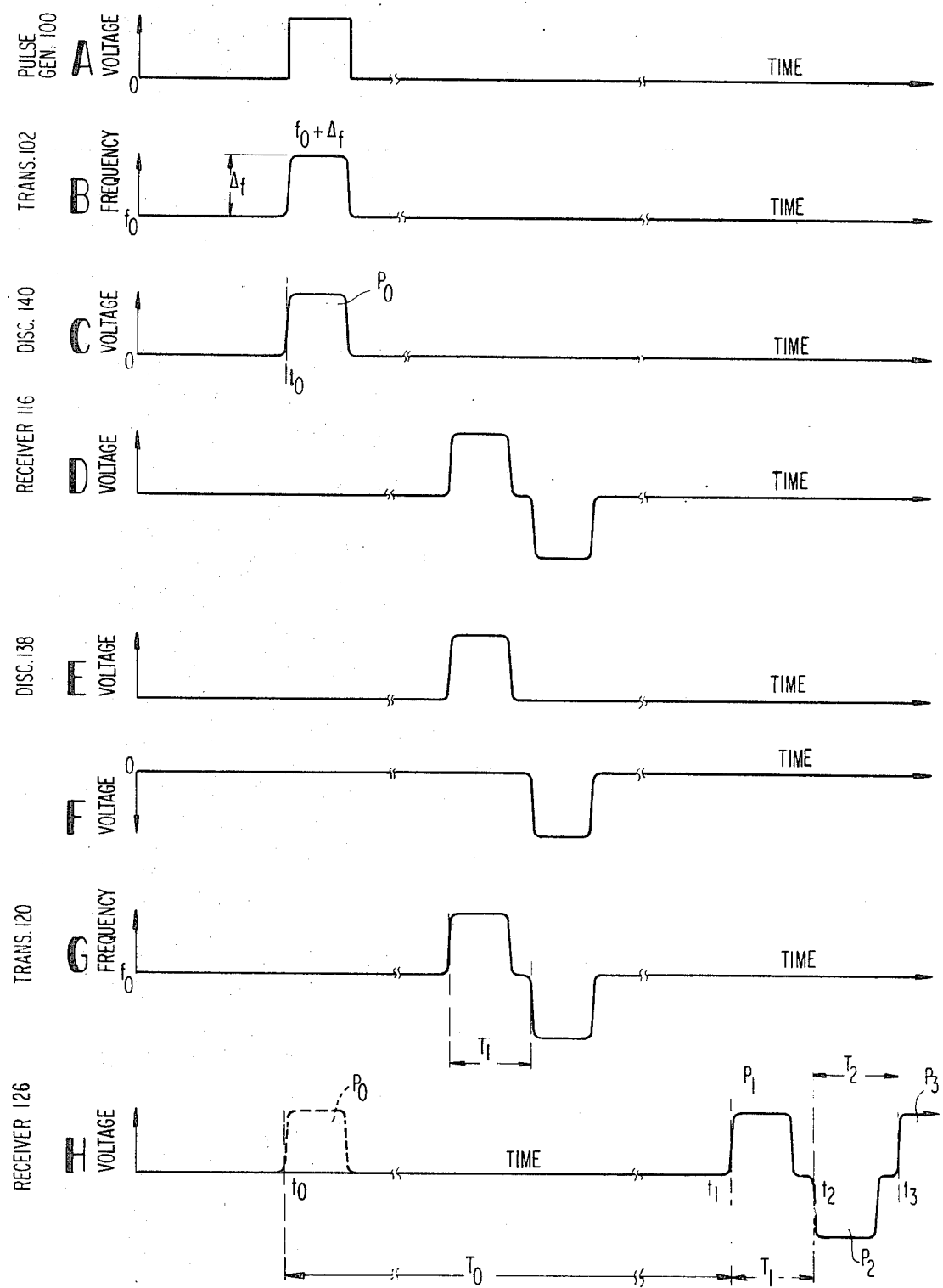
FIG. 7 illustrates waveforms at various points in the system of FIG. 6.

The operation of the range measuring system of FIG. 6 may be more clearly understood with reference to FIG. 7 where typical waveforms at various points in the system are illustrated. Referring now to both FIGS. 6 and 7, the pulse generator 100 provides a series of pulses, for example, a series of positive pulses of 0.1 microseconds duration at a repetition rate of 1.0 KHz. These pulses are utilized to modulate or vary the frequency of the output signal from the transmitter 102 to provide time reference marks illustrated in waveform B of FIG. 7. A time reference mark, i.e. the frequency change from $f_o$ to $(f_o + \Delta f)$, is detected by the FM discriminator unit 140. The output signal from the FM discriminator unit 140 is a pulse $P_o$ proportional in amplitude and duration to the amplitude and duration of the frequency modulation $\Delta f$ of the transmitted signal (waveform C of FIG. 3). This pulse $P_o$ is applied to the input terminal 146 of the computing counter 130 to initiate a counting or timing cycle at a time $t_o$.

At some later time, the transmitted signal is received at the responder unit 10, is demodulated to detect time reference marks, and the demodulated signal from the receiver 116 (waveform D of FIG. 7) is applied to non-inverting input terminal of the pulse processing circuit 119. The pulse processing circuit 119 is preferably a Model No. 7832743001 bi-polar pulse processing circuit manufactured by Collins Radio Corporation of Cedar Rapids, Iowa, and responds to the application of both positive and negative pulses. The pulse processing circuit 119 prevents receiver noise from modulating the transmitter 120 while allowing detected modulation to modulate the transmitter 120. Additionally, the pulse processing circuit 119 removes noise from the receiver 116 detected modulation signal, provides correct signal amplitude for modulating the transmitter 120 and insures that the transmitter 120 is modulated at a time occurring approximately half way between the 10 percent and 90 percent amplitude points of the detected receiver modulation signal.

The pulse processing circuit 119 thus modulates the output signal from the transmitter 120 at the approximate center of the rise time of the demodulated signal from the receiver 116 for the duration of the detected demodulated signal or time reference mark. The frequency modulation of the transmitter 120 output signal, i.e. the time reference mark, is detected by the FM discriminator unit 138 and is also transmitted back to the interrogator unit 14, where it is received by the antenna 106.

The output signal from the FM discriminator unit 138 (waveform E of FIG. 3) is applied to the inverting input terminal of the pulse processing circuit 142 which operates as was previously described to eliminate excess noise to establish the desired signal amplitude and invert the signal to provide a pulse having a negative d.c. level. This negative pulse from the pulse processing circuit 142 back-biases the diode 144 to prevent the conduction thereof, and thus reduces the frequency of the local oscillator 118 for the duration of the pulse. Since the frequency of the local oscillator 118 is reduced, the receiver IF frequency decreases proportionally and the receiver 116 generates a pulse having a negative d.c. level, as illustrated by waveform F of FIG. 7. This negative pulse is processed by the pulse processing circuit 119 previously described and the pulse processing circuit output signal drives the frequency of the output signal from the transmitter 120 in a negative direction, for example to $(f_o - \Delta f)$, for the duration of this negative pulse. Thus, the frequency of the transmitter 120 output signal is first increased to $(f_o + \Delta f)$ and then decreased to $(f_o - \Delta f)$, as illustrated in waveform G of FIG. 3.

The negative modulation is also detected by the FM discriminator unit 138, limited, and inverted. However, the inverted output signal from the pulse processing circuit 142 is a pulse having positive signal level and this signal does not affect the local oscillator 118 since positive signals are shunted to ground through the diode 144.

The time interval $T_1$ between the approximate center of the leading edge of the negative modulation signal (see waveform G of FIG. 7) is approximately equal to the signal delay introduced by the responder unit 10. Since this time interval $T_1$ is generated dynamically and varies in accordance with equipment induced variations in signal delay through the responder unit 10, a dynamic, highly accurate indication of signal delay through the responder unit 10 is provided and can be subtracted from the total propagation time in a manner subsequently to be described.

With continued reference to FIGS. 6 and 7, the transmitted signal from the responder 10 is detected by the antenna 106 of the interrogator unit 14 and is applied through the directional coupler 108 and the isolator 124 to the receiver 126. The receiver 126 demodulates the received or detected signal and the demodulated output signal, illustrated by waveform H of FIG. 7, is applied to the computing counter 130 and to the non-inverting input terminal of the pulse processing circuit 132 which operates in the manner previously described. The pulse processing circuit 132 processes both the positive and negative pulses from the receiver 126, and the positive pulses are shunted to ground through the diode 136 while the negative pulses are applied to the local oscillator 134. The local oscillator 134 may be designed so that the frequency of the output signal therefrom varies inversely with the polarity of the input signal applied thereto. Thus, the negative pulse effects an increase in the frequency of the local oscillator, thereby increasing the receiver IF frequency and in turn causing the receiver 126 to generate a pulse having a positive signal level.

This generated positive pulse from the receiver 126 is applied to the computing counter 130 and the pulse processing circuit 132. The pulse processing circuit 132 generates a positive pulse in response to this positive pulse input signal. However, the local oscillator frequency is unaffected by this second pulse since it is shunted to ground through the diode 136.

The output signal from the receiver 126 illustrated by waveform H of FIG. 7 thus includes three pulses. A first positive return pulse or time reference mark $P_1$ commencing at time $t_1$ is related in time to the pulse $P_o$ (waveform C) in accordance with the total propagation time (including equipment delays) of a time reference mark through the interrogator unit 14, the atmosphere and responder unit 10. A negative return pulse or time reference mark $P_2$ commencing at time $t_2$ is related in time to the pulse $P_1$ according to the signal delay introduced by the equipment in the responder 10, i.e. the IF, detector and output stages of the receiver 116, the pulse processing circuit 119, the transmitter 120, the isolator 122, the directional coupler 112 and the cables or waveguide connecting these components. A second positive pulse or time reference mark $P_3$ commencing at time $t_3$ is related in time to the pulse $P_2$ according to the signal delay through the receiver channel of the interrogator unit 14, i.e., the IF, detector and output stages of the receiver 126.

With continued reference to FIG. 7, the time intervals between the pulses $P_0$, $P_1$, $P_2$ and $P_3$ are related as follows:

| Pulses | Time of Occurrence | Time Interval Between Pulses |
|---|---|---|
| $P_0$ and $P_1$ | $t_o$ and $t_1$ | $T_o$ (total uncorrected propagation time) |
| $P_1$ and $P_2$ | $t_1$ and $t_2$ | $T_1$ (equipment delay of responder) |
| $P_2$ and $P_3$ | $t_2$ and $t_3$ | $T_2$ (equipment delay of interrogator) |
| $P_1$ and $P_3$ | $t_1$ and $t_3$ | $T_1+T_2$ (total equipment delay) |

It can be seen from the above table that the total propagation time attributable to the propagation of the wave energy through the atmosphere may be calculated by subtracting the total equipment delay ($T_1 + T_2$) from the total uncorrected propagation time $T_o$. The calculation $T_o - (T_1 + T_2)$ provides a highly accurate corrected propagation time $T_p$ related to the range R between the interrogator unit 14 and the responder unit 10.

It should be noted that the equipment delays represented by $T_1$ and $T_2$ above take into account the major delays introduced by that equipment through which the signal delays are most likely to vary in an unpredictable manner, e.g. the transmitters and receivers. However, some equipment delays may not be reflected in the time intervals $T_1$ and $T_2$. For example, the time interval $T_1$ does not include the amount of signal delay time in the responder unit 10 between the antenna 110 and the mixer (not shown) in the receiver 116 where the local oscillator 118 signal is mixed with the received signal.

Additionally, some equipment delay times not included in the total uncorrected propagation time interval $T_o$ of the overall loop are included in the calculated time intervals $T_1$ and $T_2$. For example, the signal delay time introduced by the FM discriminator unit 138, the limiter 142 and the local oscillator 118 is not included in the time interval $T_o$ but is included in the responder loop time interval $T_1$. These non-common delay times not common both to the overall loop defined by $T_o$ and to either the responder 10 or the interrogator 14 internal loops defined by $T_1$ and $T_2$ are relatively small. Since highly stable components, e.g. the Envar discriminator and the directional couplers, appear in these portions of the loops, these delay times are relatively constant.

However, for even greater accuracy, these non-common signal delay times in both the interrogator unit 14 and the responder unit 10 may be determined and subtracted from the proper time interval. For example, the non-common signal delay caused by the pulse processor 132 and the local oscillator 134 in the interrogator 14 internal loop may be subtracted from the dynamically calculated time interval $T_2$. The non-common signal delay caused by the directional coupler 108, the isolator 124 and the radio frequency (RF) amplifiers (not shown) in the receiver 126 (i.e. the receiver 126 stages prior to the mixer), as well as the delay caused by the directional coupler 112, the isolator 114 and the RF amplifiers in the receiver 116, may be subtracted from the calculated time interval $T_o$. These subtractions may be effected by the computing counter 130 as will hereinafter be described.

The calculation of corrected propagation time $T_p$ is accomplished by the computing counter 130. As was previously mentioned, the counting or timing cycle is commenced by detecting the FM modulation signal at or near the antenna 106 generating the pulse $P_0$ to simultaneously start a clock or counter in the computing counter 130. This clock or counter is disabled upon receipt of the positive return pulse $P_1$ and a second clock or counter is enabled by this first received positive return pulse. The next positive pulse $P_3$ disables the second counter or clock. The total time recorded on the second clock, i.e., the total responder and The signal delay introduced through the transmitting channel of the interrogator unit 14 is not needed for correcting the total propagation time for undesired delays since the counting or timing cycle is commenced by the detected frequency modulation signal at or near the antenna. However, as was previously mentioned, the relatively fixed delays in the internal interrogator and responder loops are not common to the overall range loop and the relatively fixed delays in the overall range loop which are not common to the internal interrogator and responder loops may be subtracted from the appropriate intervals $T_o$, $T_1$ and $T_2$ by properly programming the computing counter 130 in a well known manner.

This total corrected propagation time $T_p$ may then be translated into the one way range between the interrogator unit 14 and the responder 10 by multiplying the time interval by the propagation speed of electromagnetic wave energy in the atmosphere, i.e. approximately the speed of light, and thereafter dividing by 2 to obtain the one way range.

The computing counter 130 is referably a commercially available Hewlett Packard Model No. 5360 computing counter which is programmable by the insertion of integrated circuit chips to operate on several input signals in the manner described above. Thus all of the foregoing mathematical calculations, i.e. the calculation of corrected propagation time and distance, may be performed automatically in accordance with a hard wired progam inserted in the Hewlett Packard computing counter.

The transmitter 102 and the receiver 126 in the interrogator unit 14 may be a Model No. 50T26-1 transceiver and the transmitter 120 and receiver 116 in the responder unit 10 may be a Model No. 50T25-1 transceiver, both of which are manufactured by Collins Radio. Other models which function similarly may be utilized for other frequency requirements.

It should be noted that the pulse processing circuits 119, 132 and 142 may be identical Collins Radio Model No. 7832743001 bi-polar pulse processors providing inversion or non-inversion of the input signals as was previously described. However, the pulse processing circuit 142, for example, may alternatively be a Collins Radio Model No. 7832745001 unipolar pulse processor which passes pulses of only one polarity, thereby eliminating the necessity for the diode 144.

B. CONTINUOUS WAVE EMBODIMENT

A continuous wave embodiment of the range measuring system of the present invention is illustrated in FIG. 8 wherein like numerical designations have been utilized to designate elements previously described in connection with FIGS. 1 and 6.

Referring now to FIG. 8, the output signal from a suitable conventional FM transmitter 200 in the interrogator unit 14 is applied through a conventional directional coupler 202, e.g. a suitable conventional circulator or T/R tube, to the antenna 106. This signal is transmitted by the antenna 106 in the form of electromagnetic wave energy toward the responder unit 10 where the wave energy is detected by the antenna 110.

The signal detected by the antenna 110 is applied through a suitable conventional directional coupler 204 to a conventional FM receiver 206. The output signal from the receiver 206 is applied through a conventional wideband limiter 208, a conventional tracking filter 210 and a suitable fixed delay circuit 211 to a suitable conventional FM transmitter 212. The output signal from the transmitter 212 is applied through the directional coupler 204 to the antenna 110 and is transmitted back to the interrogator unit 14, where it is detected by the antenna 106. The signal detected by the antenna 106 is applied through the directional coupler 202 to a suitable conventional FM receiver 214 and the output signal from the receiver 214 is applied through a conventional wideband limiter 216, a tracking filter 218 and a suitable conventional delay circuit 219 to the transmitter 200.

The arrangement described above forms a closed loop (hereinafter referred to as the loop $L_1$) which includes all of the equipment in the transmitting and receiving channels of the interrogating unit 14 and the responder unit 10, as well as the transmission and return path, i.e. twice the atmospheric path of some length R between the antennas 106 and 110. By establishing a loop gain in excess of 1, e.g. by proper selection of various amplification factors in the closed loop, the closed loop $L_1$ will sustain oscillations at a frequency $f_1$ related to the total signal delay through the entire loop.

FM discriminator units 138 and 140 are provided, respectively, in the responder unit 10 and the interrogator unit 14. These discriminator units 138 and 140 detect the FM modulation of the output signals from the transmitters 212 and 200, respectively, at a location preferably at or adjacent to the respective antennas 110 and 106. The output signal from the FM discriminator unit 138 in the responder 10 is applied through a suitable wideband limiter 220 and a suitable filter 222 to a suitable local oscillator 224 which controls the IF frequency of the receiver 206. The output signal from the FM discriminator unit 140 in the interrogator 14 is applied through a suitable wideband limiter 226 and a suitable filter 228 to a suitable local oscillator 230 which controls the IF frequency of the receiver 214.

The above FM discriminator arrangements form closed loops within the interrogator unit 14 and the responder unit 10 which oscillate at frequencies related to equipment delays. For example, in the interrogator unit 14, the closed loop (hereinafter referred to as the loop $L_2$) includes the FM discriminator unit 140, the limiter 226, the filter 228, the local oscillator 230, the IF and output stages of the receiver 214, the limiter 216, the tracking filter 218, the delay circuit 219, the transmitter 200 and the directional coupler 202. This loop $L_2$ oscillates at a frequency $f_2$ related to the total signal delay through the entire loop $L_2$ which includes a major portion of the loop $L_1$. In the responder unit 10, the closed loop (hereinafter referred to as $L_3$) includes the FM discriminator unit 138, the limiter 220, the filter 222, the local oscillator 224, the IF and output stages of the receiver 206, the limiter 208, the tracking filter 210, the delay circuit 211, the transmitter 212 and the directional coupler 204. This loop $L_3$ oscillates at a frequency $f_3$ related to the total signal delay through the entire loop $L_3$ which includes a major portion of the loop $L_1$.

The three loop signals having frequencies $f_1$, $f_2$ and $f_3$ respectively may be monitored at a convenient point in the system, separated and utilized to calculate range as will hereinafter be described in greater detail. For example, the output signal from the delay circuit 219 may be applied to three parallel filter circuits 232, 234 and 236. The output signals from the filter circuits 232, 234 and 236 may in turn be applied to the respective input terminals 238, 240, and 242 of a conventional computing counter 130, e.g. the Hewlett Packard Model No. 5360 computing counter previously described.

The delay circuit 219 in the interrogator unit 14 is common to the loops $L_1$ and $L_2$. The delay circuit 211 in the responder unit 10 is common to the loops $L_1$ and $L_3$. To insure that the signal having frequencies $f_1$, $f_2$ and $f_3$ are sufficiently separated in frequency to allow each of the filters 232–236 to pass only a desired one of these signals, the delay circuit 219 may be designed, for example, to cause a much greater signal delay than the delay circuit 211. The natural frequency of oscillation $f_1$ of the loop $L_1$ will thus be low relative to the natural frequencies $f_2$ and $f_3$ respectively of the loops $L_2$ and $L_3$ since the loop $L_1$ includes both delay circuits 211 and 219 as well as the atmospheric path between the antennas 106 and 110. The natural frequencies $f_2$ and $f_3$ respectively of the loops $L_2$ and $L_3$ will be separated from each other by at least an amount proportional to the difference in the signal delays introduced by the respective delay circuits 219 and 211.

Further fixed delays may be added to the various loops if further frequency separation is desired. As long as these further fixed delays are common to the loop $L_1$ and one of the loops $L_2$ and $L_3$, the addition of the fixed delay will not affect the calculation of range or distance as is hereinafter described. However, if a fixed delay is included in one of the loops $L_2$ and $L_3$ which is not common to the loop $L_1$, then a compensation for the amount of the fixed delay must be included in the distance calculation performed by the computing counter as will hereinafter become apparent.

The three frequencies $f_1$, $f_2$ and $f_3$ represent time intervals $T_{S1} = 1/f_1$, $T_{S2} = 1/f_2$ and $T_{S3} = 1/f_3$. The time interval $T_{S1}$ is related to the distance R between the interrogator unit 14 and the responder 10 and includes the signal delay introduced by the equipment in these units, i.e. in the remainder of the loop $L_1$. The time intervals $T_{S2}$ and $T_{S3}$ are related to the signal delays, in particular, the unpredictable varying delays, introduced by the major portion of the equipment in the loop $L_1$, i.e. in the interrogator unit 14 and the responder unit 10, respectively. These time intervals $T_{S2}$ and $T_{S3}$ also include some relatively fixed delays introduced by equipment which is not a part of the loop $L_1$.

Thus, the computing counter 130 may be programmed to subtract the total equipment introduced delay ($T_{S2} + T_{S3}$) from the total equipment and range introduced delay $T_{S1}$ to obtain an extremtingly accurate indication of the propagation time $T_{SP}$ of the wave energy through the atmosphere between the interrogator unit 14 and the responder unit 10. For even greater accuracy, the computing counter 130 may be programmed to compensate for those relatively fixed delays in the loops $L_2$ and $L_3$ which are not common to the Loop $L_1$ and for the relatively fixed delays in the loop $L_1$ not common to the loop $L_2$ and $L_3$.

It should be noted that the loops $L_1$, $L_2$ and $L_3$ will oscillate at their natural frequencies as long as the loop gains are greater than one. The frequency bands, i.e. the ranges over which these frequencies may vary, can be approximated empirically or theoretically and the filters 232–236 designed to pass corresponding desired frequency bands. The remaining filters in the interrogator and responder units may be sized in the same manner.

III. ADVANTAGES AND SCOPE OF THE INVENTION

It is apparent from the foregoing that the present invention possesses numerous advantages over prior art systems. A primary advantage is the great accuracy of the range measurements and position determinations obtainable utilizing the method and system of the invention.

Because of the dynamic manner in which equipment signal delays are substantially eliminated, inexpensive components may be utilized throughout the system. Moreover, the need for expensive and perhaps complex circuitry and temperature control units is also eliminated.

The system is particularly adaptable to offshore use where vessel movement is encountered in that the signals need not be highly directional as in some prior art systems. Moreover, the accuracy of the position determinations and the speed at which these determinations are obtained may be particularly advantageous in offshore operations both for immediate and future use.

The use of the system in underwater pipelaying operations is very advantageous in that highly accurate pipeline positions result and highly accurate records of pipeline positions can be produced. Thus, pipelines may be deposited along extremely narrow rights of way and may be rapidly located should the need arise at a future date.

The present invention may thus be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for determining the geographical coordinates of an unknown geographical location comprising:
   first responder means at first known geographical coordinates for transmitting a first responder signal when interrogated;
   second responder means at second known geographical coordinates for transmitting a second responder signal when interrogated;
   interrogator means at said unknown geographical location for interrogating said first and second responder means and for receiving said responder signals;
   means for dynamically establishing a first time interval related in duration to time between the transmission of an interrogating signal by said interrogator means and the reception of said first responder signal, said first time interval including equipment delays introduced by said first responder means and said interrogator means;
   means for dynamically establishing a second time interval related in duration to the equipment delays introduced by said first responder means and said interrogator means;
   means responsive to said first and second dynamic time interval establishing means for generating a first distance signal related to the distance between said interrogator means and said first responder means;
   means for dynamically establishing a third time interval related in duration to the time between the transmission of an interrogating signal by said interrogator means and the reception of said second responder signal, said third time interval including equipment delays introduced by said interrogator means and said second responder means;
   means for dynamically establishing a fourth time interval related in duration to the equipment delays introduced by said second responder means and said interrogator means;
   means responsive to said third and fourth dynamic time interval establishing means for generating a second distance signal related to the distance between said interrogator means and said second responder means; and,
   means responsive to said first and second distance signals and said first and second known geographical coordinates for manifesting the geographical coordinates of said interrogator means.

2. The apparatus of claim 1 including
   a marine vessel carrying said interrogator means; and,
   means for positioning said vessel,
   said positioning means being responsive to a comparison between the geographical coordinates of said interrogator means and the geographical coordinates of a predetermined desired position.

3. The apparatus of claim 1 including:
   a marine vessel carrying said interrogator means; and,
   means for plotting the geographical coordinates of said interrogator means in real time relative to a preplotted desired route to thereby provide a record of actual vessel route relative to said desired route.

4. The apparatus of claim 3 including:
   means on said vessel for laying elongate flexible means on the sea bed;
   wherein said preplotted desired route represents the desired route of said elongate flexible means along the sea bed; and
   wherein said record comprises chart means for indicating the actual route of said elongate flexible means along the sea bed relative to said desired route thereof.

5. The apparatus of claim 4 wherein said vessel comprises a pipelaying barge and wherein said elongate flexible means is a pipeline.

6. Apparatus for determining the distance between two spaced locations comprising:
   means for dynamically establishing a first time interval related in duration to the total trip transmission time of a signal between two locations, said first time interval including an equipment introduced signal delay;

means for dynamically establishing a second time interval related in duration to said equipment introduced signal delay; and, means responsive to said first and said second time intervals for manifesting the distance between said two locations.

7. The apparatus of claim 6 wherein said signal comprises a total delay time reference mark, and wherein said first time interval establishing means comprises:

means at one of said locations for transmitting said total delay time reference mark toward the other of said locations;

means at said other of said locations for returning time reference marks toward said one of said locations;

means at said one of said locations for receiving time reference marks; and, means for measuring the time interval between the transmission and reception of said total delay time reference mark at said one of said locations to thereby establish said first time interval.

8. The apparatus of claim 7 wherein second time interval establishing means comprises:

means at said other of said locations for returning a first equipment delay time reference mark toward said one of said locations responsively to said total delay time reference mark, said first equipment delay time reference mark being related in time to said total delay time reference mark according to the amount of equipment introduced signal delay at said other of said locations.

9. The apparatus of claim 8 wherein said second time interval establishing means further includes:

means at said one of said locations for generating a second equipment delay time reference mark responsively to the reception by said receiving means of said first equipment delay time reference mark, said second equipment delay time reference mark being related in time to said first equipment delay time reference mark according to the amount of equipment introduced signal delay at said one of said locations.

10. The apparatus of claim 6 wherein said first time interval establishing means comprises:

first transmitting means at one of said locations for transmitting a first carrier signal toward the other of the locations;

second transmitting means at the other of said locations for transmitting a second carrier signal toward said one of the locations;

means at said one of said locations for marking said first carrier signal with a first time reference mark;

first receiving means at said other of said locations for receiving said first carrier signal from said one of said locations and for detecting time reference marks;

means at said other of said locations for marking said second carrier signal with a second time reference mark in response to the detection of said first time reference mark by said first receiving means;

second receiving means at said one of said locations for receiving said second carrier signal from said other of said locations and for detecting time reference marks; and, means responsive to said first and second time reference marks for establishing said first time interval.

11. The apparatus of claim 10 wherein said first time interval establishing means includes first detecting means at said one of said locations for detecting the transmission of said first time reference mark by said first transmitting means.

12. The apparatus of claim 11 wherein said first time interval establishing means includes computer means for determining the elapsed time between the detection of said first time reference mark by said first detecting means and the detection of said second time reference mark by said second receiving means.

13. The apparatus of claim 10 wherein said marking means at said one of said locations includes means for applying a pulse having a predetermined amplitude and duration to said first transmitter means to thereby rapidly effect a discrete change in the frequency of said first carrier signal for the duration of said pulse.

14. The apparatus of claim 13 wherein said marking means at said other of said locations includes means responsive to said first receiving means for applying a pulse having a predetermined amplitude and duration to said second transmitter means to thereby rapidly effect a discrete change in the frequency of said second carrier signal for the duration of said pulse.

15. The apparatus of claim 14 wherein said first receiving means includes a first FM receiver means operable to generate an output signal related to said discrete change in the frequency of said first carrier signal; and, wherein said second receiving means includes a second FM receiver means operable to generate an output signal related to a said discrete change in the frequency of said second carrier signal.

16. The apparatus of claim 15 wherein said means for applying a pulse to said first transmitter means includes pulse generator means for generating at a predetermined repetition rate a series of pulses each having a predetermined duration; and, wherein said means for applying a pulse to said second transmitting means includes pulse processing means responsive to the detection of said first time reference mark by said first receiving means.

17. The apparatus of claim 10 wherein said second time interval establishing means comprises:

means for marking second carrier signal with a first equipment delay time reference mark in response to the transmission of said second time reference mark by said second transmitting means, said first equipment delay time reference mark being spaced in time relative to said first time reference mark by an amount related to the signal delay introduced by equipment a said other of said locations; and, means for generating a second equipment delay time reference mark in response to the detection of said first equipment delay time reference mark by said second receiving means, said second equipment delay time reference mark being spacd in time relative to said first equipment delay time reference mark by an amount related to the signal delay introduced by equipment at said one of said locations.

18. The apparatus of claim 17 wherein said means for marking said second carrier signal with said first equipment delay time reference mark comprises:

discriminator means for detecting the transmission of said first time reference mark on said second carrier signal;

means for establishing a predetermined intermediate frequency of said first receiving means; and, means responsive to said discriminator means for changing the intermediate frequency of said first receiving means to thereby generate said first equipment delay time reference mark, said first equipment delay time reference mark being applied to said second transmitting means to modulate said second carrier signal by said first equipment delay time reference mark.

19. The apparatus of claim 18 wherein said means for generating a second equipment delay time reference mark comprises:

means for establishing a predetermined intermediate frequency of said second receiving means; and, means responsive to the detection by said second receiving means of said first equipment delay time reference mark on said second carrier signal for changing said intermediate frequency to thereby generate said second equipment delay time reference mark.

20. The apparatus of claim 19 wherein said second time interval establishing means includes computing means for measuring said second time interval in response to the detection by said second receiving means of said second time reference mark on said second carrier signal and to said second equipment delay time reference mark.

21. The apparatus of claim 19 wherein said second time interval establishing means includes:

computer means for determining a first equipment delay time interval responsively to the detection by said second receiving means of said second time reference mark on said second carrier signal and to the detection by said second receiving means of said first equipment delay time reference mark, for determining a second equipment delay time interval responsively to the detection by said second receiving means of said first equipment delay time reference mark and to said second equipment delay time reference mark and for summing said first and second equipment delay time intervals.

22. The apparatus of claim 6 wherein said first time interval establishing means comprises:

first closed loop means defining a first oscillator having a natural frequency, said first closed loop means including an atmospheric transmission path between the two locations and equipment at the two locations, the natural frequency of said first oscillator being related to the length of said atmospheric transmission path and said equipment introduced signal delay times, the wavelength of said first oscillator being related to said first time interval.

23. The apparatus of claim 22 wherein said second time interval establishing means comprises:

second closed loop means defining a second oscillator having a natural frequency, said second closed loop means including said equipment at one of the locations, the wavelength of said second oscillator being related to the signal delay time introduced by said equipment at said one of the locations;

third closed loop means defining a third oscillator having a natural frequency;

said third closed loop means including said equipment at the other of the locations, the natural frequency of said third oscillator being related to the signal delay time introduced by said equipment at said other of the locations, the sum of the wavelengths of said second and third oscillators being related to said second time interval.

24. The apparatus of claim 23 wherein said first closed loop means comprises:

first FM transmitter means at one of the locations for generating a first carrier signal;

second FM transmitter means at the other of the locations for generating a second carrier signal;

first FM receiver means at said one of the locations for detecting frequency modulation of said second carrier signal;

second FM receiver means at said other of the locations for detecting frequency modulation of said first carrier signal;

first and second antenna means at said one of the locations and at said other of the locations, respectively, for receiving and radiating electromagnetic wave energy;

said first FM transmitter means and said first FM receiver means being operatively connected to said first antenna means, said second FM transmitter means and said second FM receiver means being operatively connected to said second antenna means, said first FM receiver means being operatively connected to said first FM transmitter means, said second FM receiver means being operatively connected to said second FM transmitter means, said atmospheric transmission path being equal in length to twice the distance between said first and second antenna means.

25. The apparatus of claim 24, wherein said second closed loop means includes:

said first FM transmitter means;

said first FM receiver means;

discriminator means for detecting frequency modulation of said first carrier signal;

local oscillator means for establishing a predetermined intermediate frequency of said first receiver means; and, means for selectively applying the detected frequency modulation of said first carrier signal to said local oscillator means to thereby change said intermediate frequency of said first receiver means in accordance with detected frequency modulation of said first carrier signal.

26. The apparatus of claim 25 wherein said third closed loop means includes:

said second FM transmitter means;

said second FM receiver means;

discriminator means for detecting frequency modulation of said second carrier signal;

local oscillator means for establishing a predetermined intermediate frequency of said second receiver means; and means for selectively applying the detected frequency modulation of said second carrier signal to said local oscillator means to thereby change said intermediate frequency of said second receiver means in accordance with the detected frequency modulation of said second carrier signal.

27. The apparatus of claim 26 wherein said distance manifesting means comprises:
computing means for determining the wavelengths of the signals from said first, second and third oscillators in response to the natural frequencies thereof and for subtracting the sum of the wavelengths of said second and third oscillator signals from the wavelength of said first oscillator signal.

28. The apparatus of claim 23 wherein said distance manifesting means comprising:
computing means for determining the wavelengths of the signals from said first, second and third oscillators in response to the natural frequencies thereof and for subtracting the sum of the wavelengths of said second and third oscillator signals from the wavelength of said first oscillator signal.

29. A method for determining geographical coordinates comprising:
a. providing a first responder means at first known geographical coordinates for responding when interrogated;
b. interrogating said first responder means and receiving the responsive signals therfrom;
c. dynamically establishing a first time interval related in duration to the time between the transmission of the interrogating signal and the reception of a responsive signal, said first time interval including atmospheric and equipment delays;
d. dynamically establishing a second time interval related in duration to said equipment delays;
e. generating a first distance signal related to the difference between said first and second time intervals;
f. providing a second responder means at second known geographical coordinates for responding when interrogated;
g. interrogating said second responder means and receiving the responsive signals therefrom;
h. establishing a third time interval related in duration to the time between the transmission of an interrogating signal and the reception of a responsive signal, said third time interval including atmospheric and equipment delays;
i. dynamically establishing a fourth time interval related in duration to said last mentioned equipment delays;
j. generating a second distance signal related to the difference between said third and fourth time intervals; and,
k. manifesting geographical coordinates responsively to said first and second distance signals and the known geographical coordinates of said first and second responder means.

30. The method of claim 29:
wherein said first and second responder means are interrogated from a marine vessel; and
wherein the vessel is positioned responsively to a comparison between the manifested geographical coordinates and desired geographical coordinates.

31. The method of claim 29 wherein said first and second responder means are interrogated from a marine vessel including the further step of plotting the manifested geographical coordinates in real time relative to a preplotted desired route to thereby provide a record of actual vessel route relative to the desired route.

32. The method of claim 31 including the further step of laying elongate flexible means on the sea bed from the marive vessel whereby the record indicates the actual route of the elongate flexible means relative to the desired route thereof.

33. The method of claim 29 wherein said first and second responder means are interrogated from a pipelaying barge and including the further steps of:
laying a pipeline on the sea bed from the barge;
providing a chart having a preplotted desired pipeline route thereon; and,
plotting the manifested geographical coordinates on said chart to thereby provide a record of actual pipeline route relative to the desired pipeline route.

34. The method of claim 33 including the further steps of:
comparing the geographical coordinates of the desired pipeline route with the manifested geographical coordinates; and,
positioning the barge responsively to the comparison.

35. A method for determining the distance between two spaced locations comprising the steps of:
a. dynamically establishing a first time interval related in duration to the total round trip transmission time of a signal between the two locations, the first time interval including an equipment introduced signal delay;
b. dynamically establishing a second time interval related in duration to the equipment introduced signal delay; and,
c. manifesting the distance between the two locations responsively to the first and second time intervals.

36. The method of claim 35 wherein the first time interval is established by the steps of:
transmitting a total delay time reference mark from one of the locations to the other of the locations;
returning the total delay time reference mark from said other of the locations to said one of the locations;
detecting the total delay time reference mark returned from said other of the locations at said one of the locations; and,
measuring the time interval between the transmission and detection of the total delay time reference mark at said one of the locations to thereby establish the first time interval.

37. The method of claim 36 wherein the second time interval is established by the steps of:
returning a first equipment delay time reference mark to said one of the locations from said other of the locations responsively to the total delay time reference mark;
detecting the first equipment delay time reference mark at said one of the locations;
generating a second equipment delay time reference mark responsively to the detection of the first equipment delay time reference mark at said one of the locations;
detecting the second delay time reference mark at said one of the locations; and,
measuring the time interval between the detection of the total delay time reference mark and the detection of the second equipment delay time reference mark at said one of the locations to thereby establish the second time interval.

38. The method of claim 36 wherein said total delay time reference is transmitted by:

transmitting a substantially continuous wave carrier signal at a predetermined frequency; and, rapidly effecting a discrete change in the frequency of said carrier signal for a predetermined period of time.

39. The method of claim 35 wherein the first time interval is established by the steps of:

generating a first substantially sinusoidal signal having a first natural frequency related to both the total round trip transmission time of said signal between the two locations and the equipment induced signal delays; and, determining the wavelength of the sinusoidal signal to thereby determine the duration of the first time interval.

40. The method of claim 39 wherein the second time interval is established by the steps of:

generating a second substantially sinusoidal signal at a second natural frequency related to the signal delay introduced by equipment at one of the locations;

generating a third substantially sinusoidal signal at a third natural frequency related to the signal delay introduced by equipment at the other of the locations;

determining the wavelengths of the second and third sinusoidal signals; and, summing the determined wavelengths of the second and third sinusoidal signals to determine the duration of the second time interval.

41. In a method of laying a pipeline offshore including providing vessel means operable to lay a submerged pipeline in an offshore location, providing position plotting means carried by the vessel means and containing a preplotted course related to a desired position of the pipeline, determining, on the vessel means, an actual offshore position of the vessel means during the laying of the pipeline on a submerged surface, indicating on the vessel means the actual offshore position of the vessel means relative to the preplotted course and in accordance with the indicating on the vessel means, causing the vessel means to manipulate the pipeline so as to tend to cause the actual position of the vessel means to tend to bear a desired coincidence with the preplotted course, the improvement residing in:

providing a first responder means at first known geographical coordinates for responding when interrogated;

providing a second responder means at second known geographical coordinates for responding when interrogated; and, determining, on said vessel means, an actual offshore position of said vessel means during the laying of said pipeline on a submerged surface by:

interrogating said first responder means and receiving the responsive signals therefrom;

dynamically establishing a first time interval related in duration to the time between the transmission of the interrogating signal and the reception of a responsive signal, said first time interval including atmospheric and equipment delays, dynamically establishing a second time interval related in duration to said equipment delays, generating a first distance signal related to the difference between said first and second time interval, interrogating said second responder means and receiving the responsive signals therefrom, establishing a third time interval related in duration to the time between the transmission of an interrogating signal and the reception of a responsive signal, said third time interval including atmospheric and equipment delays, dynamically establishing a fourth time interval related in duration to said last mentioned equipment delays, generating a second distance signal related to the difference between said third and fourth time intervals, and manifesting geographical coordinates responsively to said first and second distance signals and the known geographical coordinates of said first and second responder means.

42. In a system for laying a pipeline offshore including vessel means operable to lay a submerged pipeline at an offshore location, position plotting means carried by said vessel means and containing a preplotted course related to a desired position of said pipeline, actual position determining means carried by said vessel means and operable to determine an actual offshore position of said vessel means during the laying of said pipeline on a submerged surface, and indicating means on said vessel means operable to indicate said offshore position of said vessel means relative to said preplotted course, said vessel means being operable, in accordance with operation of said indicating means, to manipulate said pipeline so as to tend to cause said actual position of said vessel means to bear a desired coincidence with said preplotted course, the improvement residing in:

first reponder means at first known geographical coordinates for transmitting a first responder signal when interrogated;

second responder means at second known geographical coordinates for transmitting a second responder signal when interrogated;

actual position determining means carried by said vessel means and including :

interrogator means for interrogating said first and second responder means and for receiving said responder signals;

means for dynamically establishing a first time interval related in duration to the time between the transmission of an interrogating signal by said interrogator means and the reception of said responder signal, said first time interval including equipment delays introduced by said first responder means and said interrogator means;

means for dynamically establishing a second time interval related in duration to the equipment delays introduced by said first responder means and said interrogator means;

means responsive to said first and second dynamic time interval establishing means for generating a first distance signal related to the distance between said interrogator means and said first responder means;

means for establishing a third time interval related in duration to the time between the transmission of an interrogating signal by said interrogator means and the reception of said second responder signal, said third time interval including equipment delays introduced by said interrogator means and said second responder means;

means for dynamically establishing a fourth time interval related in duration to the equipment delays introduced by said second responder means and said interrogator means;

means responsive to said third and fourth dynamic time interval establishing means for generating a second distance signal related to the distance between said interrogator means and said second responder means; and, means responsive to said first and second distance signals and said first and second known geographical coordinates for manifesting the geographical coordinates of said interrogator means to thereby determine an actual offshore position of said vessel means.

* * * * *